(12) United States Patent
Liao et al.

(10) Patent No.: US 12,719,095 B2
(45) Date of Patent: Aug. 25, 2026

(54) BATTERY TEST APPARATUS AND TEST METHOD

(71) Applicant: CONTEMPORARY AMPEREX TECHNOLOGY CO., LIMITED, Ningde (CN)

(72) Inventors: Guolong Liao, Ningde (CN); Shaoteng Ren, Ningde (CN); Lixin Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 202 days.

(21) Appl. No.: 18/219,166

(22) Filed: Jul. 7, 2023

(65) Prior Publication Data

US 2024/0106014 A1 Mar. 28, 2024

Related U.S. Application Data

(63) Continuation of application No. PCT/CN2023/083975, filed on Mar. 27, 2023.

(30) Foreign Application Priority Data

Sep. 27, 2022 (CN) ......................... 202211182906.0

(51) Int. Cl.
*H01M 10/42* (2006.01)
*G01L 5/00* (2006.01)

(52) U.S. Cl.
CPC ....... *H01M 10/4285* (2013.01); *G01L 5/0061* (2013.01)

(58) Field of Classification Search
CPC ......................... H01M 10/4285; G01L 5/0061
See application file for complete search history.

(56) References Cited

U.S. PATENT DOCUMENTS

2018/0123189 A1* 5/2018 Biswas .................. G01N 29/28
2023/0375449 A1* 11/2023 Kim ......................... G01N 3/10

FOREIGN PATENT DOCUMENTS

| | | | |
|---|---|---|---|
| CN | 209085921 U | | 7/2019 |
| CN | 210465171 U | | 5/2020 |
| CN | 216208151 U | | 4/2022 |
| DE | 102020128794 A1 | | 5/2022 |
| KR | 20220063611 A | * | 5/2022 |

OTHER PUBLICATIONS

International Search Report mailed on Jun. 21, 2023, received for PCT Application PCT/CN2023/083975, filed on Mar. 27, 2023, 6 pages including English Translation.

* cited by examiner

*Primary Examiner* — Stephanie E Bloss
*Assistant Examiner* — Michael A Harrison
(74) *Attorney, Agent, or Firm* — XSENSUS LLP

(57) ABSTRACT

A battery test apparatus for testing a swelling force of a battery housing may include equivalent end plates and a retractable part. An actual battery module may be replaced by the battery test apparatus, eliminating the need for a battery module and accompanying charging and discharging devices and reducing the test cost. Two equivalent end plates may be spaced apart along a first direction to replace a battery module actually in contact with the battery housing along the first direction. The retractable part may be arranged between the two equivalent end plates. The retractable part may compress the two equivalent end plates to make the equivalent end plates compress the battery housing.

12 Claims, 4 Drawing Sheets

BATTERY TEST APPARATUS AND TEST METHOD

CROSS-REFERENCE TO RELATED APPLICATIONS

This application is a continuation of International Application No. PCT/CN20231083975, filed Mar. 27, 2023, which claims priority to Chinese Patent Application 202211182906.0, filed on Sep. 27, 2022 and entitled "BATTERY TEST APPARATUS AND TEST METHOD", each of which is incorporated herein by reference in its entirety.

TECHNICAL FIELD

This application relates to the field of battery technologies, and in particular, to a battery test apparatus and test method.

BACKGROUND

With the continuous development of new energy vehicles, requirements on the performance of traction batteries are getting higher and higher. A battery typically includes a plurality of battery modules arranged inside. The battery modules may swell and deform during charging and discharging of the battery. Therefore, it is necessary to test the swelling force of the battery housing when new batteries are designed.

At present, test apparatuses used in swelling force tests for battery housings are still open to improvements.

SUMMARY

In view of the above problems, this application provides a battery test apparatus and test method that can shorten the test cycle and reduce the test cost.

According to a first aspect, this application provides a battery test apparatus for testing a swelling force of a battery housing. The battery test apparatus includes: equivalent end plates, where the two equivalent end plates are spaced apart along a first direction; and a retractable part, arranged between the two equivalent end plates and is retractable along the first direction so that the retractable part is able to compress the equivalent end plates.

In solutions of embodiments of this application, the battery test apparatus for testing a swelling force of a battery frame includes equivalent end plates and a retractable part. An actual battery module is replaced by the battery test apparatus, eliminating the need for a battery module and accompanying charging and discharging devices and reducing the test cost. Two equivalent end plates are spaced apart along a first direction to replace a battery module actually in contact with the battery housing along the first direction. The retractable part is arranged between the two equivalent end plates. The retractable part compresses the two equivalent end plates to make the equivalent end plates compress the battery housing. This is used to replace compression on the battery housing by swelling and deformation of the actual battery module during a charging and discharging process. Compared with the charging and discharging process of the actual battery module, an extension and contraction process of the retractable part requires less time, shortening the test cycle. Thus, application of the battery test apparatus can shorten the test cycle and reduce the test cost.

In some embodiments, the retractable part includes an actuator member or actuator and a transmission member or structure arranged in sequence along the first direction, and the actuator member is configured to drive the transmission member to reciprocate along the first direction.

In the technical solution of the embodiments of this application, the retractable part includes the actuator member and the transmission member. The actuator member is configured to drive the transmission member. Reciprocation of the transmission member along the first direction replaces swelling and contraction of an actual battery module along the first direction during a charging and discharging process. Thus, the test cycle is shortened and the test cost is reduced.

In some embodiments, two transmission members are connected to two ends of the actuator member along the first direction so that the actuator member is able to drive the two transmission members to reciprocate along the first direction.

In the technical solution of the embodiments of this application, two transmission members are connected to two ends of the actuator member along the first direction, alleviating the problem of reduced accuracy of test results due to a difference in stress conditions of the equivalent end plates on two sides.

In some embodiments, an end of the transmission member away from the actuator member is connected with a push plate, and the push plate is configured to push the equivalent end plate.

In the technical solution of the embodiments of this application, an end of the transmission member away from the actuator member is connected with a push plate, and the transmission member pushes the equivalent end plate through the push plate. The push plate prevents a direct contact between the transmission member and the equivalent end plate and plays a role of protecting the transmission member.

In some embodiments, an area of a cross-section of the push plate perpendicular to the first direction is greater than an area of a cross-section of the transmission member perpendicular to the first direction.

In the technical solution of the embodiments of this application, an area of a cross-section of the push plate perpendicular to the first direction is greater than an area of a cross-section of the transmission member perpendicular to the first direction. The push plate increases the size of a contact area between the transmission member and the equivalent end plate, reducing the risk of the equivalent end plate being scratched due to too large a pressure caused by too small a contact area between the transmission member and the equivalent end plate.

In some embodiments, center of the push plate and centers of the equivalent end plates are in a straight line extending along the first direction.

In the technical solution of embodiments of this application, the push plate and the equivalent end plates are in a straight line along the first direction, which alleviates the problem of deviation of a pushing force conducted to the push plate by the transmission member from a compression force of the equivalent end plates on the battery housing, caused by the existence of an angle between the push plate and the equivalent end plates. This problem affects accuracy of test results. As center of the push plate and centers of the equivalent end plates are in a straight line along the first direction, the centers of the equivalent end plates are subjected to a compression force from the push plate, so that all parts of the equivalent end plates evenly compress the battery housing, which improves the accuracy of test results.

In some embodiments, the retractable part further includes a pressure sensor. The pressure sensor is arranged between the transmission member and the push plate, for collecting pressure information fed back from the push plate.

In the technical solution of the embodiments of this application, the pressure sensor is arranged between the transmission member and the push plate for collecting and displaying pressure information fed back from the push plate, allowing power of the actuator member to be more accurately and conveniently adjusted, thus improving the accuracy and practicality of the battery test apparatus.

In some embodiments, center of the pressure sensor and center of the push plate are in a straight line extending along the first direction.

In the technical solution of the embodiments of this application, center of the pressure sensor and center of the push plate are in a straight line extending along the first direction, so that the pressure sensor can accurately display the pressure along the first direction fed by the push plate, improving accuracy of the battery test apparatus.

In some embodiments, the transmission member is a lead screw, and the lead screw is threaded to the actuator member.

In the technical solution of the embodiments of this application, the lead screw is threaded to the actuator member, which improves the reliability of connection between the lead screw and the actuator member.

According a second aspect, this application provides a test method including:

- placing the battery test apparatus according to any one of the embodiments of the first aspect in a battery housing under test;
- starting the retractable part to make the retractable part extend and deform along the first direction and compress the equivalent end plates;
- controlling the retractable part so that the retractable part retracts and deforms along the first direction; and
- stopping the retractable part after the retractable part has reciprocally compressed the equivalent end plates N times and checking whether there is any crack on the surface of the battery housing under test, where N>0.

In the technical solution of the embodiments of this application, the battery test apparatus is placed inside the battery housing under test. The battery test apparatus replaces an actual battery module, reducing the test cost. After the retractable part is started, compression of the battery housing by the extension and retraction of the retractable part along the first direction replaces compression of the battery housing by the swelling and contraction process of an actual battery module, shortening the test cycle.

In some embodiments, in the step of starting the retractable part to make the retractable part extend and deform along the first direction and compress the equivalent end plates, the retractable part is made to extend along the first direction to cause the retractable part to compress the equivalent end plates until the retractable part reaches a peak load.

In the technical solution of the embodiments of this application, the peak load is used to replace compression force, caused by swelling, on the battery housing when an actual battery module is fully charged, which improves accuracy of the test method.

In some embodiments, in the step that the retractable part is made to extend along the first direction to cause the retractable part to compress the equivalent end plates until the retractable part reaches a peak load, the retractable part is held at the peak load and held there for a first time t1, where t1>0.

In the technical solution of the embodiments of this application, the retractable part is held at the peak load and held there for the first time t1, which is used to replace the hold time of a battery module after a full charging, improving accuracy of the test method.

In some embodiments, in the step of controlling the retractable part so that the retractable part retracts and deforms along the first direction, the retractable part is made to retract along the first direction to cause the retractable part to leave the equivalent end plates until the retractable part reaches a valley load.

In the technical solution of the embodiments of this application, the valley load is used to replace compression force on the battery housing when an actual battery module is fully discharged, which improves accuracy of the test method.

In some embodiments, in the step that the retractable part is made to retract along the first direction to cause the retractable part to leave the equivalent end plates until the retractable part reaches a valley load, the retractable part is held at the valley load and held there for a second time t2, where t2>0.

In the technical solution of the embodiments of this application, the retractable part is held at the valley load and held there for the second time t2, which is used to replace the hold time of a battery module after a full discharging, improving accuracy of the test method.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, like parts are represented by like reference signs. In the accompanying drawings.

Figures 1, 2:
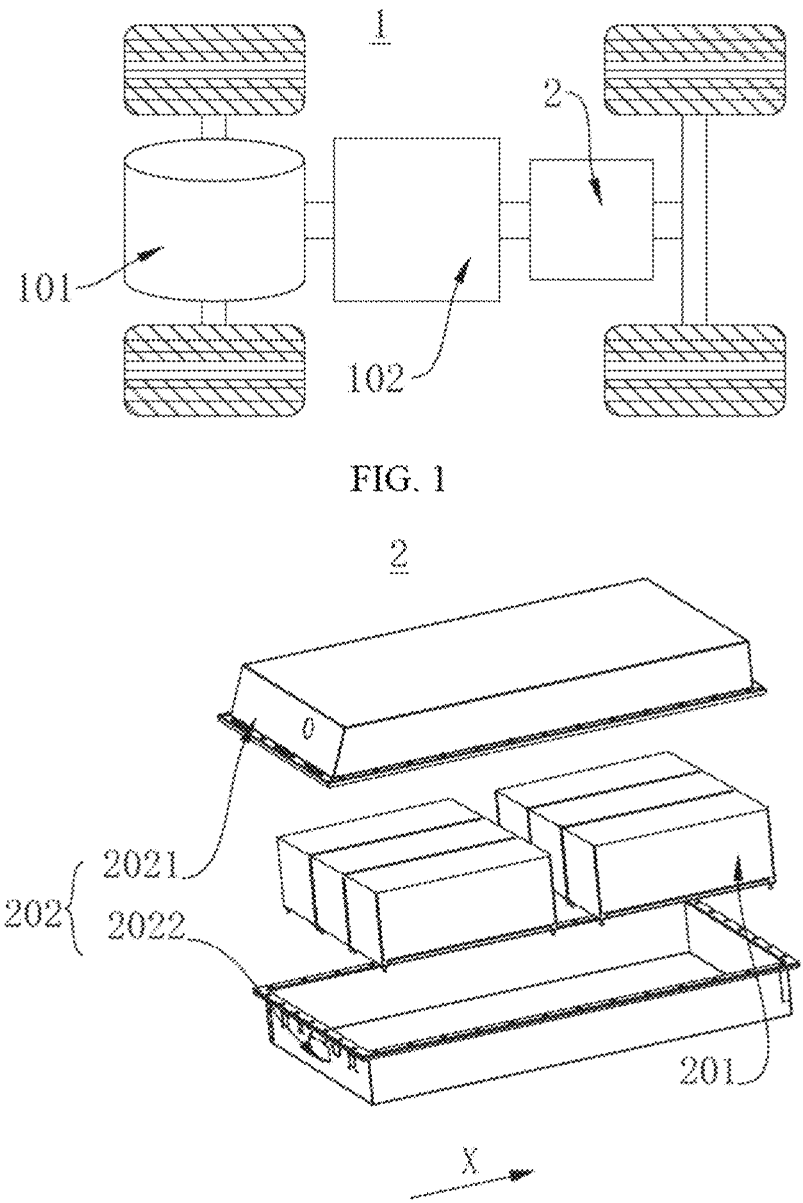
FIG. 1 is a schematic structural diagram of a vehicle according to an embodiment of this application.
FIG. 2 is a schematic structural diagram of a battery module according to an embodiment of this application.

Reference signs in specific embodiments are as follows:

1. vehicle; 2. battery; 101. motor; 102, controller; 202. housing; 2021. first housing portion; 2022. second housing portion; 201. battery module; 3. battery cell; 4. battery test apparatus; 41. equivalent end plate; 42.

retractable part; 421. actuator member; 422. transmission member; 423. push plate; 424. pressure sensor; and 425. open-sided rectangular frame.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

It should be noted that, unless otherwise specified, the technical or scientific terms used in the embodiments of the present application shall have meanings as commonly understood by persons skilled in the art to which the embodiments of the present application pertain.

In the description of the embodiments of this application, the orientations or positional relationships indicated by the technical terms "center", "longitudinal" "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the apparatuses or components mentioned must have specific orientations, or must be constructed or manipulated according to specific orientations, and therefore shall not be construed as any limitations on embodiments of this application.

In addition, the technical terms "first", "second", and the like are merely for the purpose of description, and shall not be understood as any indication or implication of relative importance or any implicit indication of the number of technical features indicated. In the description of this application, "a plurality of" means at least two unless otherwise specifically stated.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

In the description of the embodiments of the present application, unless otherwise clearly specified and defined, a first feature being "on" or "under" a second feature may mean that the first and second features are in direct contact, or the first and second features are in indirect contact through an intermediary. Moreover, that the first feature is "above", "over", and "on" the second feature may mean that the first feature is directly above or obliquely above the second feature or simply mean that the first feature has a higher level than the second feature. That the first feature is "below", "beneath", and "under" the second feature may mean that the first feature is directly below or obliquely below the second feature or simply mean that the first feature has a lower level than the second feature.

Currently, from the perspective of market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of application fields of traction batteries, market demands for traction batteries are also increasing.

In this application, the battery cell may include a lithium-ion secondary battery cell, a lithium-ion primary battery cell, a lithium-sulfur battery cell, sodium-lithium-ion battery cell, a sodium-ion battery cell, a magnesium-ion battery cell, or the like. This is not limited in the embodiments of this application. The battery cell may be cylindrical, flat, cuboid, or of other shapes, which is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a housing configured to enclose one or more battery cells. The box can prevent liquids or other foreign matter from affecting charging or discharging of the battery cell.

The inventors of this application have noted that a battery module swells and compresses a battery housing during charging and discharging cycling of the battery. A long-term swelling and compression may cause irreversible impacts on the battery housing, resulting in deformation or cracking of the battery housing. Therefore, it is necessary to test swelling force of the battery housing when designing a new battery. However, at present, battery swelling force tests have the problem of long test cycle and high cost.

After research, the inventors have found that the current test method is to verify the effect of swelling force of a battery module on the battery housing by performing the charging and discharging cyclings on the actual battery module. Due to limitation of the preparation time and the charging and discharging process of the battery module, a single test takes a long time and requires that the battery module under test be equipped with a charging/discharging device, causing high test cost.

Based on the above problems found by the inventor, the inventor designed a battery test apparatus for testing a swelling force of a battery housing. The battery test apparatus includes equivalent end plates and a retractable part. An actual battery module is replaced by the battery test apparatus, eliminating the need for a battery module and accompanying charging and discharging devices and reducing the test cost. Two equivalent end plates are spaced apart along a first direction to replace a battery module that actually abuts against the battery housing along the first direction. The retractable part is arranged between the two equivalent end plates. The retractable part compresses the two equivalent end plates to make the equivalent end plates compress the battery housing. This is used to replace compression on the battery housing by swelling and deformation of the actual battery module during a charging and discharging process. Compared with the charging and discharging process of the actual battery module, an extension and contraction process of the retractable part requires less time, shortening the test cycle.

The electric apparatus may be a vehicle, a mobile phone, a portable device, a notebook computer, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, an electric toy airplane, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric apparatus.

It should be understood that the technical solutions described in the embodiments of this application are not only applicable to the batteries and electric devices described above, but also applicable to all batteries including a housing and electric devices using batteries. However, for the brevity of description, in the following embodiments, the electric vehicle is used as an example for description.

Refer to FIG. 1. FIG. 1 is a schematic structural diagram of a vehicle 1 according to some embodiments of this application. The vehicle 1 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1 is provided with a battery 2 inside, where the battery may be arranged at the bottom, front or rear of the vehicle 1. The battery 2 may be configured to supply power to the vehicle 1. For example, the battery 2 may be used as an operational power supply for the vehicle 1. The vehicle 1 may further include a controller 102 and a motor 101, where the controller 102 is configured to control the battery to supply power to the motor 101, for example, to satisfy power needs of start, navigation, and driving of the vehicle 1.

In some embodiments of this application, the battery can be used as not only the operational power supply for the vehicle 1 but also a driving power supply for the vehicle 1, replacing or partially replacing fossil fuel or natural gas to provide driving traction for the vehicle 1.

In order to meet different requirements for power use, the battery 2 may include a plurality of battery cells. A battery cell is a smallest element constituting a battery module or battery pack. A plurality of battery cells can be connected in series and/or in parallel through electrode terminals for various application scenarios. The battery 2 mentioned in this application includes a battery module or a battery pack. Here, the plurality of battery cells may be connected in series, parallel, or series-parallel, where being connected in series-parallel means a combination of series and parallel connections. In the embodiments of this application, the plurality of battery cells may be directly combined into a battery pack, or they may be first combined into battery modules which are then combined into a battery pack.

FIG. 2 is a schematic structural diagram of a battery 2 according to an embodiment of this application.

As shown in FIG. 2, the battery includes a housing 202 and a battery cell (not shown in FIG. 2), and the battery cell is accommodated in the housing 202.

The housing 202 may be a simple three-dimensional structure such as a cuboid or cylindrical or spherical structure or may be a complex three-dimensional structure combining simple three-dimensional structures such as cuboid or cylindrical or spherical structures. The housing 202 may be made of an alloy material such as an aluminum alloy or iron alloy, a polymer material such as polycarbonate or polyisocyanurate foam, or a composite material produced from materials such as glass fiber and epoxy resin.

The housing 202 is configured to accommodate the battery cell, and the housing 202 may be of various structures. In some embodiments, the housing 202 may include a first housing portion 2021 and a second housing portion 2022. The first housing portion 2021 and the second housing portion 2022 fit together, so that the first housing portion 2021 and the second housing portion 2022 jointly define an accommodating space for accommodating the battery cell 3. The second housing portion 2022 may be a hollow structure with an opening at one side, the first housing portion 2021 is a plate-shaped structure, and the first housing portion 2021 covers the opening side of the second housing portion 2022 so as to form the housing 202 having the accommodating space. Alternatively, both the first housing portion 2021 and the second housing portion 2022 may be hollow structures with an opening at one side, and the opening side of the first housing portion 2021 fits with the opening side of the second housing portion 2022 so as to form the housing 202 having the accommodating space. Certainly, the first housing portion 2021 and the second housing portion 2022 may be in various shapes, such as cylinder or cuboid.

In order to improve airtightness after connection of the first housing portion 2021 and the second housing portion 2022, a sealing element, such as sealing gum and sealing ring, may further be disposed between the first housing portion 2021 and the second housing portion 2022.

Assuming that the first housing portion 2021 fits on the top of the second housing portion 2022, the first housing portion 2021 may also be referred to as an upper box part, and the second housing portion 2022 may also be referred to as a lower box part.

There may be one or more battery cells in the battery 2. Under the condition that a plurality of battery cells are provided, the plurality of battery cells may be connected in series, parallel, or series-parallel, where being connected in series-parallel means a combination of series and parallel connections of the plurality of battery cells. The plurality of battery cells may be directly connected in series, parallel, or series-parallel, and then an entirety of the plurality of battery cells is accommodated in the housing 202; or certainly, the battery may be formed by a plurality of battery cells being connected in series, parallel, or series-parallel first to form a battery module 201 and then a plurality of battery modules 201 being connected in series, parallel, or series-parallel to form an entirety, which is accommodated in the housing 202.

Figure 3:
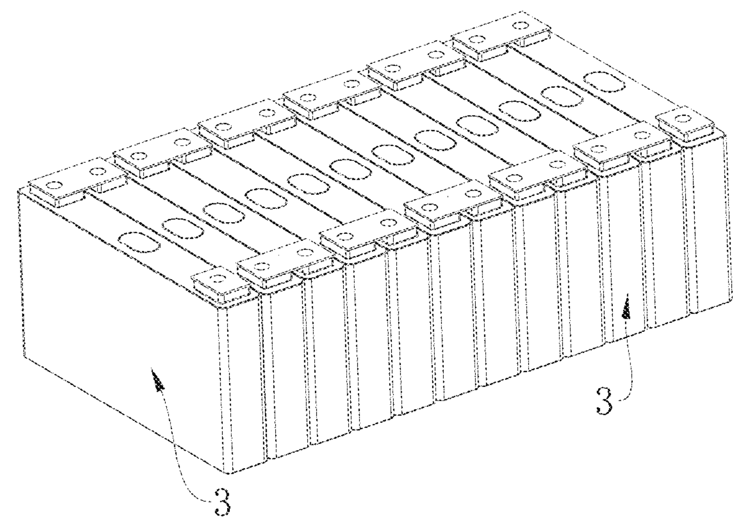
FIG. 3 is a schematic structural diagram of a battery module according to an embodiment of this application.

FIG. 3 is a schematic structural diagram of a battery module 201 according to an embodiment of this application.

In some embodiments, as shown in FIG. 2 and FIG. 3, there are a plurality of battery cells 3, and the plurality of battery cells 3 are first connected in series, parallel, or series-parallel to form battery modules 201. A plurality of battery modules 201 are then connected in series, parallel, or series-parallel to form an entirety which is accommodated in the housing 202.

The plurality of battery cells 3 in a battery module 201 may be electrically connected via a busbar, so that the plurality of battery cells 3 in the battery module 201 are connected in series, parallel, or series-parallel.

Figure 4:
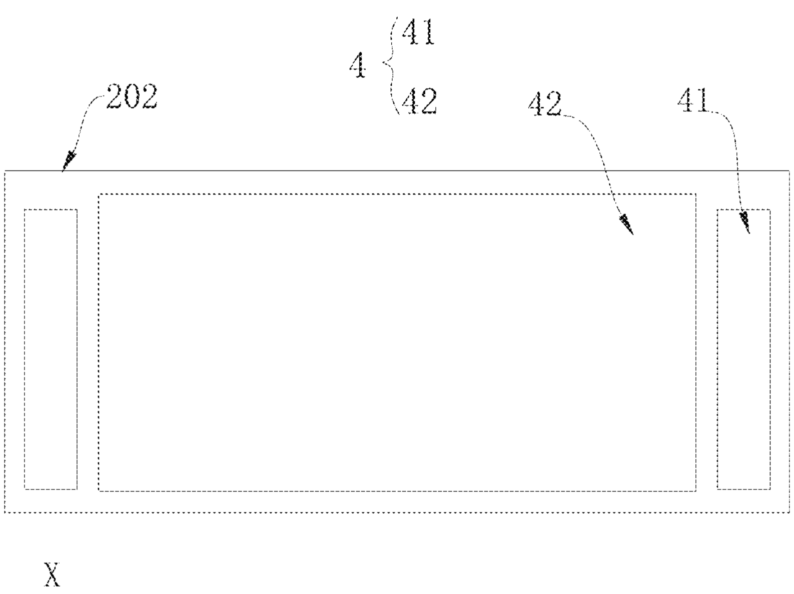
FIG. 4 is a schematic structural diagram of a battery test apparatus according to an embodiment of this application.

Refer to FIG. 2 to FIG. 4. FIG. 4 is a schematic structural diagram of a battery test apparatus 4 according to an embodiment of this application.

As shown in FIG. 4, an embodiment of this application provides a battery test apparatus 4 for testing swelling force of a battery housing 202. The battery test apparatus 4 includes equivalent end plates 41 and a retractable part 42, where the two equivalent end plates 41 are spaced apart along the first direction X, and the retractable part 42 is arranged between the two equivalent end plates 41 and retractable along the first direction X so that the retractable part 42 is able to compress the equivalent end plates 41.

As shown in FIG. 2, a plurality of battery modules 201 are arranged inside a battery along the first direction X. During a charging and discharging process, the battery modules 201 will swell and deform along the first direction X. This compression force generated by the swelling and deformation of the plurality of battery modules 201 acts on the battery housing 202 through the battery modules 201 that are in contact with the battery housing 202 along the first direction X.

In the battery test apparatus, the battery modules 201 in contact with the battery housing 202 along the first direction X are replaced by the equivalent end plates 41; the swelling force of the battery modules 201 is replaced by the compression force of the retractable part 42 along the first direction X; the battery modules 201 arranged along the first direction X in the actual battery housing 202 are replaced by the equivalent end plates 41 and the retractable part 42 arranged along the first direction X; and a charging and discharging process of the battery modules 201 is replaced by an extension and retraction process of the retractable part 42. During a test, the battery test apparatus 4 is placed inside the battery housing 202, the retractable part 42 pushes the equivalent end plates 41, and the equivalent end plates 41 compress the battery housing 202, replacing the compression caused by swelling of the battery modules 201 on the battery housing 202. Thus, the battery test apparatus 4 can be applied to swelling force testing for the battery housing 202 instead of the actual battery modules 201. Additionally, compared with actual battery modules 201, the battery test apparatus 4 has an adjustable speed for a single extension and retraction process. A time length required for a single extension and retraction process of the retractable part 42 is less than a time length required for a single charging and discharging process of the battery module 201, effectively shortening the test cycle. Furthermore, when the battery test apparatus 4 is applied, various charging and discharging devices accompanying the battery modules 201 are not required, reducing the test cost.

It can be understood that the battery test apparatus 4 can also be applied to swelling force testing for a housing 202 of a battery with only a single battery module 201 provided inside. In this case, two equivalent end plates 41 replace surfaces on two sides of the battery module 201 shell along the first direction X.

That "the retractable part 42 is arranged between the two equivalent end plates 41 and retractable along the first direction X" means that the retractable part 42 has a length adjustable in the range of L1 to L2 along the first direction X, and the distance between the two equivalent end plates 41 along the first direction X is L3, where $L2>L3\geq L1$, and $L1\neq 0$.

Optionally, the two equivalent end plates 41 are spaced apart in parallel along the first direction X. Additionally, during the test, when the battery test apparatus 4 is placed inside the battery housing 202, two wall plates of the battery housing 202 arranged opposite each other along the first direction X are parallel to the two equivalent end plates 41. This alleviates the problem of reduced test accuracy due to the existence of an angle between the equivalent end plates 41 and the wall plates of the battery housing 202 in the test process.

Optionally, the equivalent end plates 41 are of the same material as the actual battery module 201 housing to improve accuracy of the results. Optionally, the equivalent end plates 41 may be made of an alloy material such as an aluminum alloy or iron alloy, a polymer material such as polycarbonate or polyisocyanurate foam, or a composite material produced from materials such as glass fiber and epoxy resin.

In these embodiments, the battery test apparatus 4 for testing swelling force of a battery housing 202 includes equivalent end plates 41 and a retractable part 42. An actual battery module 201 is replaced by the battery test apparatus 4, eliminating the need for a battery module 201 and accompanying charging and discharging devices and reducing the test cost. The two equivalent end plates 41 are spaced apart along a first direction X to replace a battery module 201 actually in contact with the battery housing 202 along the first direction X. The retractable part 42 is arranged between the two equivalent end plates 41. The retractable part 42 compresses the two equivalent end plates 41 to make the equivalent end plates 41 compress the battery housing 202. This is used to replace compression on the battery housing 202 by swelling and deformation of the actual battery module 201 during a charging and discharging process. Compared with a charging and discharging process of the actual battery module 201, an extension and retraction process of the retractable part 42 requires less time, shortening the test cycle. Thus, application of the battery test apparatus 4 can shorten the test cycle and reduce the test cost.

Figure 5:
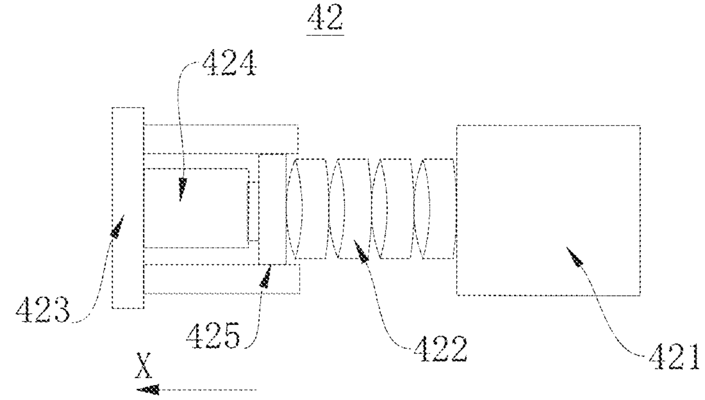
FIG. 5 is a schematic structural diagram of a retractable part of a battery test apparatus according to an embodiment of this application.

Refer to FIG. 4 and FIG. 5. FIG. 5 is a schematic structural diagram of a retractable part 42 of a test apparatus according to an embodiment of this application.

In some embodiments, as shown in FIG. 4 and FIG. 5, the retractable part 42 includes an actuator member 421 and a transmission member 422 arranged in sequence along the first direction X, and the actuator member 421 is configured to drive the transmission member 422 to reciprocate along the first direction X.

The actuator member 421 provides power to the transmission member 422, and the transmission member 422 reciprocates along the first direction X to achieve the effect of reciprocation of the retractable part 42 along the first direction X.

The retractable part 42 includes the actuator member 421 and one transmission member 422 arranged along the first direction X. During a battery swelling force test, the actuator member 421 is started and drives the transmission member 422 to move away from the actuator member 421 along the first direction X. When the transmission member 422 is in contact with an equivalent end plate 41 at one side, the transmission member 422 pushes the equivalent end plate 41 to continue to move along the first direction X until the equivalent end plate 41 is in contact with the battery housing 202. In this process, due to a reaction force, the actuator member 421 also moves away from the transmission member 422 along the first direction X until the actuator member 421 is in contact with an equivalent end plate 41 on the other side and continues to push the equivalent end plate 41 until the equivalent end plate 41 is in contact with the battery housing 202. The actuator member 421 continues to drive the transmission member 422 to the effect that the battery test apparatus 4 compresses the battery housing 202.

Optionally, the drive form of the actuator member 421 may be gear drive, hydraulic drive, electromagnetic drive, or the like.

The battery test apparatus 4 also includes a control member electrically connected to the actuator member 421. Before starting of the actuator member 421, test parameters are input into the control member. The control member controls the operation of the actuator member 421 to regulate the retractable motion of the retractable part 42 along the first direction X.

In these embodiments, the retractable part 42 includes the actuator member 421 and the transmission member 422. The actuator member 421 is configured to drive the transmission member 422. Reciprocation of the transmission member 422 along the first direction X replaces swelling and contraction of an actual battery module along the first direction X during a charging and discharging process. Thus, the test cycle is shortened and the test cost is reduced.

Figure 6:
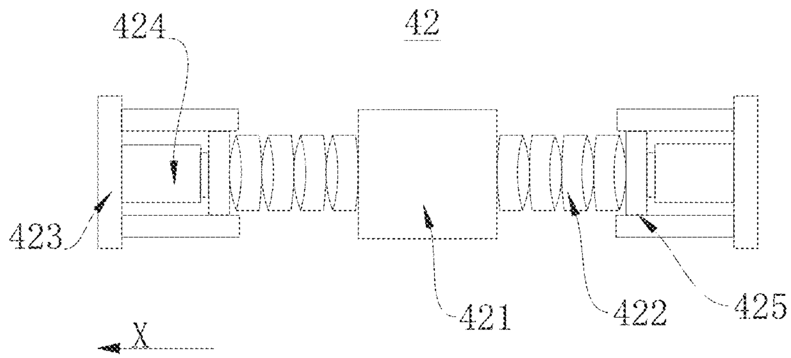
FIG. 6 is a schematic structural diagram of a retractable part of a battery test apparatus according to another embodiment of this application.

Refer to FIG. 6. FIG. 6 is a schematic structural diagram of a retractable part 42 of a battery test apparatus 4 according to another embodiment of this application.

In some embodiments, as shown in FIG. 6, two transmission members 422 are connected to two ends of the actuator member 421 along the first direction X so that the actuator member 421 is able to drive the two transmission members 422 to reciprocate along the first direction X.

The two transmission members 422 are arranged in a straight line extending along the first direction X, and the two transmission members 422 have the same shape at the ends in contact with the equivalent end plates 41. Compared with the configuration of a single transmission member 422, this configuration allows the two equivalent end plates 41 to be each in contact with a transmission member 422. This reduces the difference in the forces applied to the two equivalent end plates 41 and helps to improve accuracy of test results.

Optionally, one actuator member 421 may control the motion of both transmission members 422; or, two sub-actuator members are provided within one actuator member 421, with each sub-actuator member driving one transmission member 422.

In these embodiments, two transmission members 422 are connected to two ends of the actuator member 421 along the first direction X, alleviating the problem of reduced accuracy of test results due to a difference in stress conditions of the equivalent end plates 41 on two sides.

In some embodiments, as shown in FIG. 4 to FIG. 6, an end of the transmission member 422 away from the actuator member 421 is connected with a push plate 423, and the push plate 423 is configured to push the equivalent end plate 41.

Optionally, the push plate 423 is made of a rigid material. Optionally, the push plate 423 is of the same material as the equivalent end plate 41.

Optionally, the push plate 423 is connected to the transmission member 422 by bonding or welding.

Optionally, along the first direction X, the push plate 423 is connected to an open-sided rectangular frame 425 at the side facing toward the transmission member 422. The push plate 423 is connected to the transmission member 422 via the open-sided rectangular frame 425.

In these embodiments, the end of the transmission member 422 away from the actuator member 421 is connected with a push plate 423, and the transmission member 422 pushes the equivalent end plate 41 through the push plate 423. The push plate 423 prevents a direct contact between the transmission member 422 and the equivalent end plate 41 and plays a role of protecting the transmission member 422.

In some embodiments, as shown in FIG. 4 to FIG. 6, an area of a cross-section of the push plate 423 perpendicular to the first direction X is greater than an area of a cross-section of the transmission member 422 perpendicular to the first direction X.

In the case that only one transmission member 422 is provided in the retractable part 42, the wall surface, of the actuator member 421, in contact with the equivalent end plate 41 has the same shape and size as the push plate 423.

In the case that two transmission members 422 are provided in the retractable part 42, the two push plates 423 have the same shape and size.

In these embodiments, an area of a cross-section of the push plate 423 perpendicular to the first direction X is greater than an area of a cross-section of the transmission member 422 perpendicular to the first direction X. The push plate 423 increases the size of a contact area between the transmission member 422 and the equivalent end plate 41, reducing the risk of the equivalent end plate 41 being scratched due to too large a pressure caused by too small a contact area between the transmission member 422 and the equivalent end plate 41.

In some embodiments, center of the push plate 423 and centers of the equivalent end plates 41 are in a straight line extending along the first direction X, as shown in FIG. 4 to FIG. 6.

In these embodiments, the push plate 423 and the equivalent end plates 41 are in a straight line along the first direction X, which alleviates the problem of deviation, of a pushing force conducted to the push plate 423 by the transmission member 422, from a compression force of the equivalent end plates 41 on the battery housing 202, caused by the existence of an angle between the push plate 423 and the equivalent end plates 41. This problem affects accuracy of test results. As center of the push plate 423 and centers of the equivalent end plates 41 are in a straight line along the first direction X, the centers of the equivalent end plates 41 are subjected to a compression force from the push plate 423, so that all parts of the equivalent end plate 41*s* evenly compress the battery housing 202, which improves the accuracy of test results.

In some embodiments, as shown in FIG. 4 to FIG. 6, the retractable part 42 also includes a pressure sensor 424, which is arranged between the transmission member 422 and the push plate 423, for collecting pressure information fed back from the push plate 423.

The pressure sensor 424 is arranged between the transmission member 422 and the push plate 423 for collecting pressure information fed back from the push plate 423. The pressure fed back from the push plate 423 is the reaction force of a compression force of the push plate 423 on the battery housing 202. Therefore, the value of the compression force of the battery test apparatus 4 on the battery housing 202 can be easily read by the pressure sensor 424.

The pressure sensor 424 is electrically connected to the control member. The pressure sensor 424 provides feedback to the control member on the current pressure information to assist the control member in adjusting the retractable motion of the retractable part 42 along the first direction X.

In these embodiments, the pressure sensor 424 is arranged between the transmission member 422 and the push plate 423 for collecting and displaying pressure information fed back from the push plate 423, allowing the actuator member 421 to be more accurately and conveniently adjusted, thus improving the accuracy and practicality of the battery test apparatus 4.

In some embodiments, center of the pressure sensor 424 and center of the push plate 423 are in a straight line extending along a first direction X, as shown in FIG. 4 to FIG. 6.

Optionally, center of the pressure sensor 424, center of the push plate 423, and centers of the equivalent end plates 41 are in a straight line extending along the first direction X.

In these embodiments, center of the pressure sensor 424 and center of the push plate 423 are in a straight line extending along the first direction X. The pressure sensor 424 can accurately indicate the pressure fed by the push plate 423 in the first direction X, improving the accuracy and practicality of the battery test apparatus 4.

In these embodiments, as shown in FIG. 6, the transmission member 422 is a lead screw, and the lead screw is threaded to the actuator member 421.

In these embodiments, the lead screw is threaded to the actuator member 421, which improves the reliability of connection between the lead screw and the actuator member 421.

Figure 7:
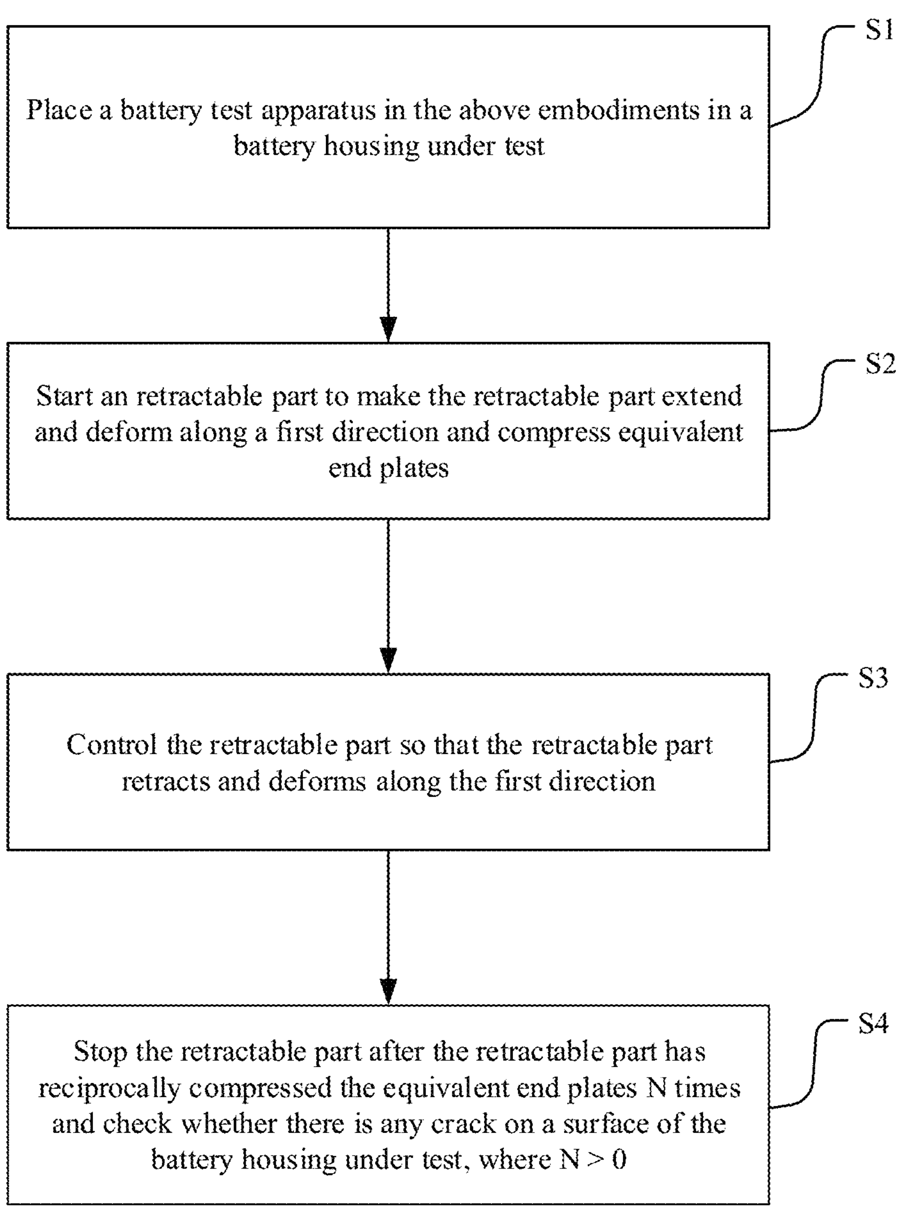
FIG. 7 is a flowchart of a test method according to an embodiment of this application.

Refer to FIG. 4 to FIG. 7. FIG. 7 is a flowchart of a test method according to an embodiment of this application. The test method employs the above battery test apparatus and therefore is discussed in relation to the apparatus.

As shown in FIG. 4 to FIG. 7, an embodiment of this application also provides a test method. The test method includes:

Step S1: Place the battery test apparatus 4 in the above embodiments in a battery housing 202 under test.

Step S2: Start the retractable part 42 to make the retractable part 42 extend and deform along the first direction X and compress the equivalent end plates 41.

Step S3: Control the retractable part 42 so that the retractable part 42 retracts and deforms along the first direction X.

Step S4: Stop the retractable part 42 after the retractable part 42 has reciprocally compressed the equivalent end plates 41 N times and check whether there is any crack on the surface of the battery housing 202 under test, where N>0.

In step S3, when the retractable part 42 retracts and deforms along the first direction X, it is not necessarily required that the retractable part 42 is separated from the equivalent end plates 41. In other words, the compression force of the retractable part 42 on the battery housing 202 is not necessarily 0 after the retraction process is completed. That "the retractable part 42 retracts along the first direction X" only requires that a compression force of the retractable part 42 on the battery housing 202 during the retraction process is lower compared to a compression force of the retractable part 42 on the battery housing 202 during an extension process.

Optionally, a method for checking whether there is any crack on the surface of the battery housing 202 under test may be visual inspection, microscopic analysis, CT scan, ultrasonic inspection, or the like.

In these embodiments, the battery test apparatus 4 is placed inside the battery housing 202 under test. The battery test apparatus 4 replaces an actual battery module, reducing the test cost. After the retractable part 42 is started, compression of the battery housing 202 by the extension and retraction of the retractable part 42 along the first direction X replaces compression of the battery housing 202 by the swelling and contraction process of an actual battery module, shortening the test cycle. In some embodiments, as shown in FIG. 4 to FIG. 7, in step S2, the retractable part 42 is made to extend along the first direction X to cause the retractable part 42 to compress the equivalent end plates 41 until the retractable part 42 reaches a peak load.

Optionally, the peak load is the compression force of an actual battery module on the battery housing 202 when the battery module is fully charged.

In these embodiments, the peak load is used to replace compression force, caused by swelling, on the battery housing 202 when an actual battery module is fully charged, which improves accuracy of the test method.

In some embodiments, as shown in FIG. 6 to FIG. 7, in the above steps, the retractable part 42 is held at the peak load and held there for a first time t1, where t1>0.

In these embodiments, the retractable part 42 is held at the peak load and held there for the first time t1, which is used to replace the hold time of a battery module after a full charging, improving accuracy of the test method.

In some embodiments, as shown in FIG. 4 to FIG. 7, in step S3, the retractable part 42 is made to retract along the first direction X to cause the retractable part 42 to leave the equivalent end plates 41 until the retractable part 42 reaches a valley load.

Optionally, the valley load is the compression force of a battery module on the battery housing 202 when the battery module is fully discharged.

In these embodiments, the valley load is used to replace compression force on the battery housing 202 when an actual battery module is fully discharged, which improves accuracy of the test method.

In some embodiments, as shown in FIG. 6 to FIG. 7, in the above steps, the retractable part 42 is held at the valley load and held there for a second time t2, where t2>0.

Optionally, the time from when the peak load hold time t1 of the retractable part 42 has elapsed to when the retractable part 42 reaches the valley load is t3; the time from when the valley load hold time t2 of the retractable part 42 has elapsed to when the retractable part 42 reaches the peak load is t4. The values of t3 and t4 are freely adjustable and t3 and t4 may be equal or unequal. t3 and t4 may be set to values smaller than charging and discharging time lengths of an actual battery module to achieve the purpose of shortening the test cycle.

In these embodiments, the retractable part 42 is held at the valley load and held there for the second time t2, which is used to replace the hold time of a battery module after a full discharging, improving accuracy of the test method.

According to some embodiments of this application, as shown in FIG. 1 to FIG. 7, this application provides a battery test apparatus 4 for testing swelling force of a battery housing 202. The battery test apparatus 4 includes equivalent end plates 41 and a retractable part 42. The two equivalent end plates 41 are spaced apart along the first direction X. The retractable part 42 is arranged between the two equivalent end plates 41 and retractable along the first direction X so that the retractable part 42 is able to compress the equivalent end plates 41.

The retractable part 42 includes an actuator member 421 and a transmission member 422 arranged in sequence along the first direction X, and the actuator member 421 is configured to drive the transmission member 422 to reciprocate along the first direction X. The transmission member 422 is a lead screw, and the lead screw is threaded to the actuator member 421. An end of the transmission member 422 away from the actuator member 421 is connected with a push plate 423, and the push plate 423 is configured to push the equivalent end plate 41. An area of a cross-section of the push plate 423 perpendicular to the first direction X is greater than an area of a cross-section of the transmission member 422 perpendicular to the first direction X.

A pressure sensor 424 is provided between the transmission member 422 and the push plate 423, for collecting pressure information from the push plate 423, with center of the pressure sensor 424 and center of the push plate 423 and center of the equivalent end plate 41 in a straight line extending along the first direction X.

In these embodiments, the battery test apparatus 4 for testing swelling force of a battery housing 202 includes equivalent end plates 41 and a retractable part 42. An actual battery module 201 is replaced by the battery test apparatus 4, eliminating the need for a battery module 201 and accompanying charging and discharging devices and reducing the test cost. The two equivalent end plates 41 are spaced apart along a first direction X to replace a battery module 201 actually in contact with the battery housing 202 along the first direction X. The retractable part 42 is arranged between the two equivalent end plates 41. The retractable part 42 compresses the two equivalent end plates 41 to make the equivalent end plates 41 compress the battery housing 202. This is used to replace compression on the battery housing 202 by swelling and deformation of the actual battery module 201 during a charging and discharging process. Compared with a charging and discharging process of the actual battery module 201, an extension and retraction process of the retractable part 42 requires less time, shortening the test cycle. Thus, application of the battery test apparatus can shorten the test cycle and reduce the test cost.

An embodiment of this application also provides a test method, as shown in FIG. 1 to FIG. 7, including:

- placing the battery test apparatus 4 in the above embodiments in a battery housing 202 under test;
- starting the retractable part 42 to make the retractable part 42 extend and deform along the first direction X and compress the equivalent end plates 41 until the retractable part 42 reaches a peak load, the retractable part 42 being held at the peak load and held there for a first time t1, where t1>0;
- controlling the retractable part 42 so that the retractable part 42 retracts and deforms along the first direction X and leaves the equivalent end plates 41 until the retractable part 42 reaches a valley load, the retractable part 42 being held at the valley load and held there for a second time t2, where t2>0; and
- stopping the retractable part 42 after the retractable part 42 has reciprocally compressed the equivalent end plates N times and checking whether there is any crack on the surface of the battery housing 202 under test, where N>0.

In these embodiments, the battery test apparatus 4 is placed inside the battery housing 202 under test. The battery test apparatus 4 replaces an actual battery module 201, reducing the test cost. After the retractable part 42 is started, compression of the battery housing 202 by the extension and retraction of the retractable part 42 along the first direction X replaces compression of the battery housing 202 by the swelling and retraction process of an actual battery module 201, shortening the test cycle.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A battery test apparatus for testing a swelling force of a battery housing, wherein the battery test apparatus comprises:

- equivalent end plates, wherein two of the equivalent end plates are spaced apart along a first direction; and
- a retractable structure arranged between the two of the equivalent end plates and retractable along the first direction so that the retractable structure is able to compress and move the equivalent end plates along the first direction,
- wherein the retractable structure comprises an actuator and a transmission structure arranged in sequence along the first direction, and the actuator drives the transmission structure to reciprocate along the first direction,
- a drive form of the actuator is gear drive or electromagnetic drive, and
- the transmission structure is a lead screw, and the lead screw is threaded to the actuator.

2. The battery test apparatus according to claim 1, wherein two such transmission structures are connected to two ends of the actuator along the first direction so that the actuator is able to drive the two transmission structures to reciprocate along the first direction.

3. The battery test apparatus according to claim 1, wherein an end of the transmission structure away from the actuator is connected with a push plate, and the push plate is configured to push the equivalent end plate.

4. The battery test apparatus according to claim 3, wherein an area of a cross-section of the push plate perpendicular to the first direction is greater than an area of a cross-section of the transmission structure perpendicular to the first direction.

5. The battery test apparatus according to claim 3, wherein a center of the push plate and centers of the equivalent end plates are in a straight line extending along the first direction.

6. The battery test apparatus according to claim 3, wherein the retractable structure further comprises:

- a pressure sensor arranged between the transmission structure and the push plate, to collect pressure information fed back from the push plate.

7. The battery test apparatus according to claim 6, wherein a center of the pressure sensor and a center of the push plate are in a straight line extending along the first direction.

8. A test method comprising:

- placing the battery test apparatus according to claim 1 in a battery housing under test;
- starting the retractable structure to make the retractable structure extend and deform along the first direction and compress the equivalent end plates;
- controlling the retractable structure so that the retractable structure retracts and deforms along the first direction; and stopping the retractable structure after the retractable structure has reciprocally compressed the equivalent end plates N times and checking whether there is any crack on the surface of the battery housing under test, wherein N>0.

9. The test method according to claim 8, wherein in the step of starting the retractable structure to make the retractable structure extend and deform along the first direction and compress the equivalent end plates, the retractable structure is made to extend along the first direction to cause the retractable structure to compress the equivalent end plates until the retractable structure reaches a peak load.

10. The test method according to claim 9, wherein in the step that the retractable structure is made to extend along the first direction to cause the retractable structure to compress the equivalent end plates until the retractable structure reaches a peak load, the retractable structure is held at the peak load and held there for a first time t1, wherein t1>0.

11. The test method according to claim 9, wherein in the step of controlling the retractable structure so that the retractable structure retracts and deforms along the first direction, the retractable structure is made to retract along the first direction to cause the retractable structure to leave the equivalent end plates until the retractable structure reaches a valley load.

12. The test method according to claim 11, wherein in the step that the retractable structure is made to retract along the first direction to cause the retractable structure to leave the equivalent end plates until the retractable structure reaches a valley load, the retractable structure is held at the valley load and held there for a second time t2, wherein t2>0.

* * * * *